United States Patent [19]

Kemmochi

[11] Patent Number: 5,130,808
[45] Date of Patent: Jul. 14, 1992

[54] IMAGE FORMING APPARATUS WITH DOT CONCENTRATION

[75] Inventor: Kazuhisa Kemmochi, Yokohama, Japan

[73] Assignee: Canon Kabushiki Kaisha, Tokyo, Japan

[21] Appl. No.: 525,321

[22] Filed: May 18, 1990

[30] Foreign Application Priority Data

May 19, 1989 [JP] Japan .................. 1-124526

[51] Int. Cl.$^5$ .................. H04N 1/23; H04N 1/46
[52] U.S. Cl. .................. 358/298; 358/457; 358/80
[58] Field of Search ............. 358/298, 455, 456, 458, 358/471, 75, 80, 357, 466; 340/728

[56] References Cited

U.S. PATENT DOCUMENTS

| | | | |
|---|---|---|---|
| 4,553,173 | 11/1985 | Kawamura | 358/298 |
| 4,561,025 | 12/1985 | Tsuzuki | 358/298 |
| 4,578,713 | 3/1986 | Tsao | 358/298 |
| 4,733,230 | 3/1988 | Kurihara et al. | 358/456 |
| 4,809,063 | 2/1989 | Moriguchi et al. | 358/298 |
| 4,969,053 | 11/1990 | Outa et al. | 358/471 |
| 4,974,067 | 11/1990 | Suzuki et al. | 358/458 |

FOREIGN PATENT DOCUMENTS 63-293062 11/1988 Japan .

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

An image forming apparatus for forming a color image from image data on an image having a plurality of colors. Density conversion information is stored with respect to pixel blocks having a predetermined phase and a predetermined configuration, which blocks are provided for each color. Pixel density values of image data items corresponding to each of the density conversion blocks are successively compared with a predetermined threshold value, and the compared image data item is converted according to the density conversion information if it is the case that pixel density is less than predetermined threshold value is satisfied, thereby limiting changes in color tones at a highlighted portion of the image and stabilizing the color tones.

14 Claims, 13 Drawing Sheets

MAGENTA

CYAN

YELLOW

BLACK

MAGENTA

CYAN

YELLOW

BLACK

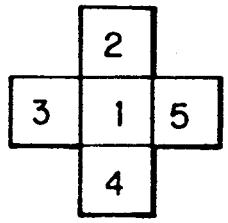 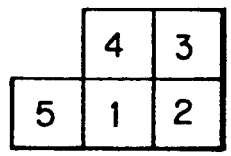 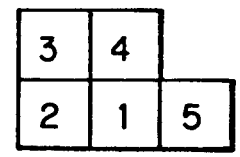
Fig. 11A  Fig. 11B  Fig. 11C
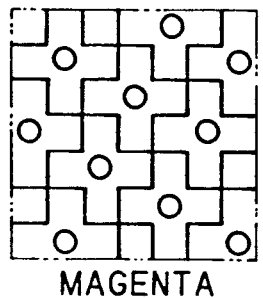 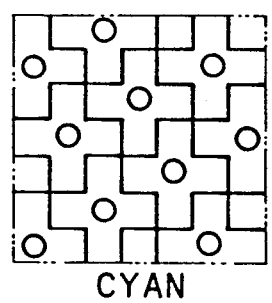
Fig. 12A  Fig. 12B
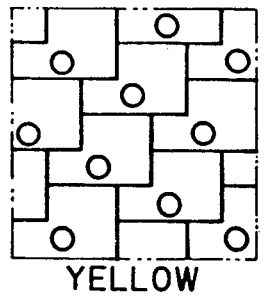 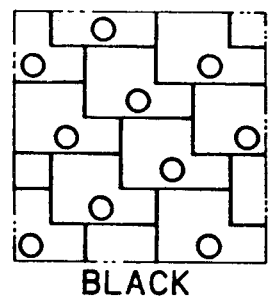
Fig. 12C  Fig. 12D

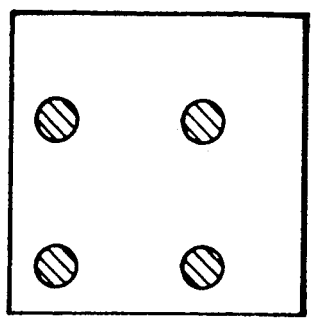
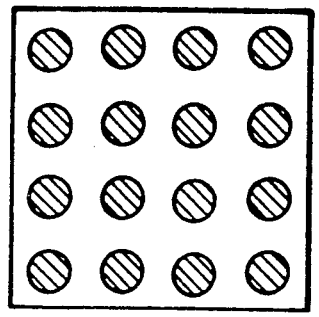
Fig. 14A  Fig. 14B  Fig. 14C  Fig. 14D  Fig. 14E

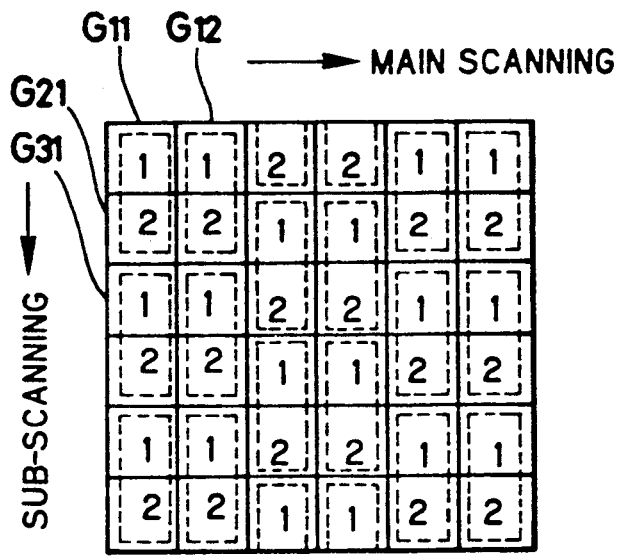
Fig. 15A MAGENTA
Fig. 15B CYAN
Fig. 15C YELLOW
Fig. 15D BLACK

IMAGE FORMING APPARATUS WITH DOT CONCENTRATION

BACKGROUND OF THE INVENTION

1. Field of the Invention

This invention relates to image forming apparatus and, more particularly, to an image forming apparatus for forming a color image by superposing a plurality of colors.

2. Description of the Prior Art

An electrophotography typelaser beam printer is known as an apparatus of this kind. This type of printer is capable of forming a half-tone image while achieving high resolution and good gradation characteristics by using a density signal obtained by pulse-width code modulation (PWM), although it is based on a binary recording system.

However, if the PWM method is adopted, a problem occurs relating to image formation at very small density in a highlighted portion of an image. That is, referring to FIG. 8 which is a diagram of the timing of dot formation in accordance with the PWM method, if the maximum time width of a PWM signal (f) is T, the width (h) of a spot of laser light is to be changed according to the PWM signal width t as the signal width t changes between O (white dot) and T (black dot). However, the substantial laser driving force is, in fact, as represented by a waveform (g) depending upon operating characteristics of the semiconductor laser element and the circuit for driving the same. In addition, the semiconductor laser element does not emit light unless the supplied current exceeds a predetermined threshold level Ish (FIG. 9). There is no problem when the PWM signal width is T (full tone) or $t_2$ (half-tone), but, when the PWM signal width is $t_3$ (highlight tone), it is uncertain whether the laser emission is actually on or off with respect to the corresponding spot width (h). Even if it is on, density formation based on the electrophotography method is very unstable in this case, and it is not possible to effect density formation with stability. When the PWM signal width is $t_4$, image density formation is not effected at all. Consequently, no black dots are formed with respect to highlighted portions of a PWM signal width of $t_3$ (e.g., 10 ns) or less.

To solve this problem, the applicant of the present invention has already proposed (in U.S. Ser. No. 07/423,383, filed Oct. 19, 1989) an image formation method in which the density of a highlighted portion is concentrated on a certain pixel in a block (density concentration method).

Figures 13A, 13B, 13C, 13D:
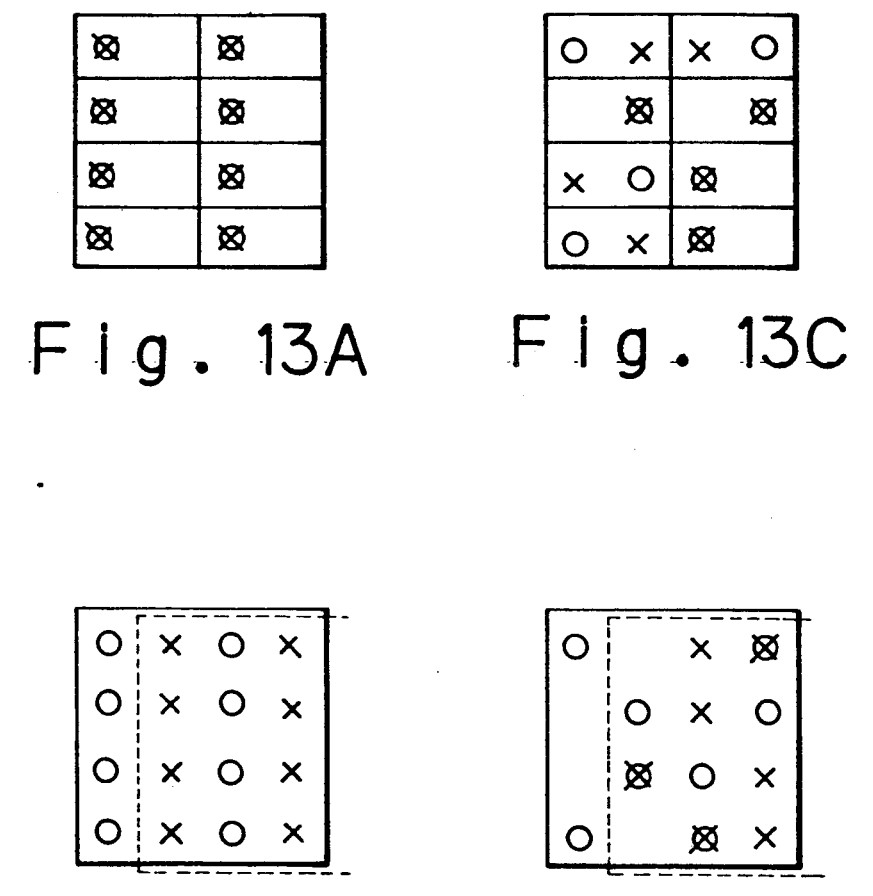

FIGS. 13A to 13D are diagrams showing an example of application of the density concentration method to multiple color image formation. FIG. 13A illustrates a case in which the direction of density concentration is fixed (e.g., to the left). As illustrated, in a highlighted portion of an image, both the density of color ○ and the density of color x are concentrated on the left hand side. The density of the highlighted portion, which may be lost by the conventional method, can be substantially reproduced if these two colors are superposed. However, if the superposing printing of the color X is shifted rightward to an extent corresponding to one dot as shown in FIG. 13B, the two colors are not superposed at all and the difference between the color tones based on the conditions shown in FIGS. 13A and 13B is very large. Since the dot formation density in the highlighted portion is small, the change in the color tone is particularly sensible.

FIG. 13C illustrates a case in which the direction in which the direction of density concentration is random. As illustrated, the density of color ○ and the density of color x are concentrated in random directions. Accordingly, the lost density of the highlighted portion is reproduced at a certain rate by superposing these two colors. However, if the superposing printing of the color x is shifted rightward to an extent corresponding to one dot as shown in FIG. 13D, the rate at which the two colors are superposed varies and the color tone is therefore unstable as between the conditions shown in FIGS. 13C and 13D.

FIGS. 14A to 14E are diagrams showing states of dot formation of highlighted and half-tone portions of an image. Highlight data items (representing a pixel density of, e.g., 15) shown in FIG. 14A are concentrated on, for example, the upper-left pixels (with a pixel density of 60) in respective unit blocks (each containing 2×2 pixels), as shown in FIG. 14B, and are recorded as dots with a spot diameter in accordance with the pixel density of 60, as shown in FIG. 14C. However, since the dot formation density (number of dots per unit area) in each block of the highlighted portion is reduced to ¼ in this manner, the change in the color tone caused by an error in color superposition at this portion is sensible.

On the other hand, half-tone data items (representing a pixel density of, e.g., 60) shown in FIG. 14D are directly used for dot recording, as shown in FIG. 14E. Since the dot formation density of this half-tone portion is large, the change in the color tone is inconspicuous. Thus, it is important to cope with the problem of changes in color tones of highlighted image portions.

SUMMARY OF THE INVENTION

In view of the above-described shortcomings of the conventional art, it is an object of the present invention to provide an image forming apparatus capable of limiting changes in color tones when a color superposition error occurs.

To achieve this object, according to one aspect of the present invention, there is provided an image forming apparatus comprising: an input means for inputting image data on an image having a plurality of colors; a storage means for storing information on density conversion blocks having a predetermined phase and a predetermined configuration with respect to each color; a conversion means for comparing pixel density values of image data items corresponding to each of the density conversion blocks memorized by the storage means with a predetermined threshold value, and for converting the compared image data item according to the density conversion information if it is the case that the pixel density<(the predetermined threshold value) is a binary coding means for converting image data output from the conversion means into a binary signal corresponding to the density designated by this image data; and an image forming means for forming a color image in which the plurality of colors are superposed in accordance with the binary signals output from the binary coding means.

Preferably, the threshold value is set to a value not smaller than the minimum of pixel density levels at which image development can be effected by said image forming means.

In the thus-constructed apparatus, the input means inputs image data on an image having a plurality of colors. The storage means has information on density conversion blocks having a predetermined phase and a predetermined configuration with respect to each color. The conversion means compares pixel density values of image data items corresponding to each of the density conversion blocks memorized by the storage means with a predetermined threshold value, and converts the compared image data item to in accordance with the density conversion information if it is so that the pixel density is less than (the predetermined threshold value. Preferably, the threshold value is set to a value not smaller than the minimum of pixel density levels at which image development can be effected by said image forming means. The binary coding means thereafter converts image data output from the conversion means into a binary signal corresponding to the density designated by this image data. The image forming means forms a color image in which the plurality of colors are superposed in accordance with the binary signals output from the binary coding means.

These and other objects and features of the present invention will become clear upon reading the following description taken in conjunction with the accompanying drawings.

BRIEF DESCRIPTION OF THE DRAWINGS

FIGS. 11A to 11C are diagrams of block types in accordance with other embodiments;

FIGS. 12A to 12D are diagrams of examples of application of the density conversion blocks of the embodiments shown in FIG. 11 to magenta to black processing;

FIGS. 13A to 13D are diagrams of application of the density concentration method to multi-color image formation;

FIGS. 14A to 14E are diagrams showing states of dot formation of highlighted and half-tone portions of an image; and FIGS. 15A to 15D are diagrams of an example of density conversion information in accordance with a further embodiment of the present invention.

DESCRIPTION OF THE PREFERRED EMBODIMENTS

Embodiments of the present invention will be described below with reference to the accompanying drawings.

Figure 1:
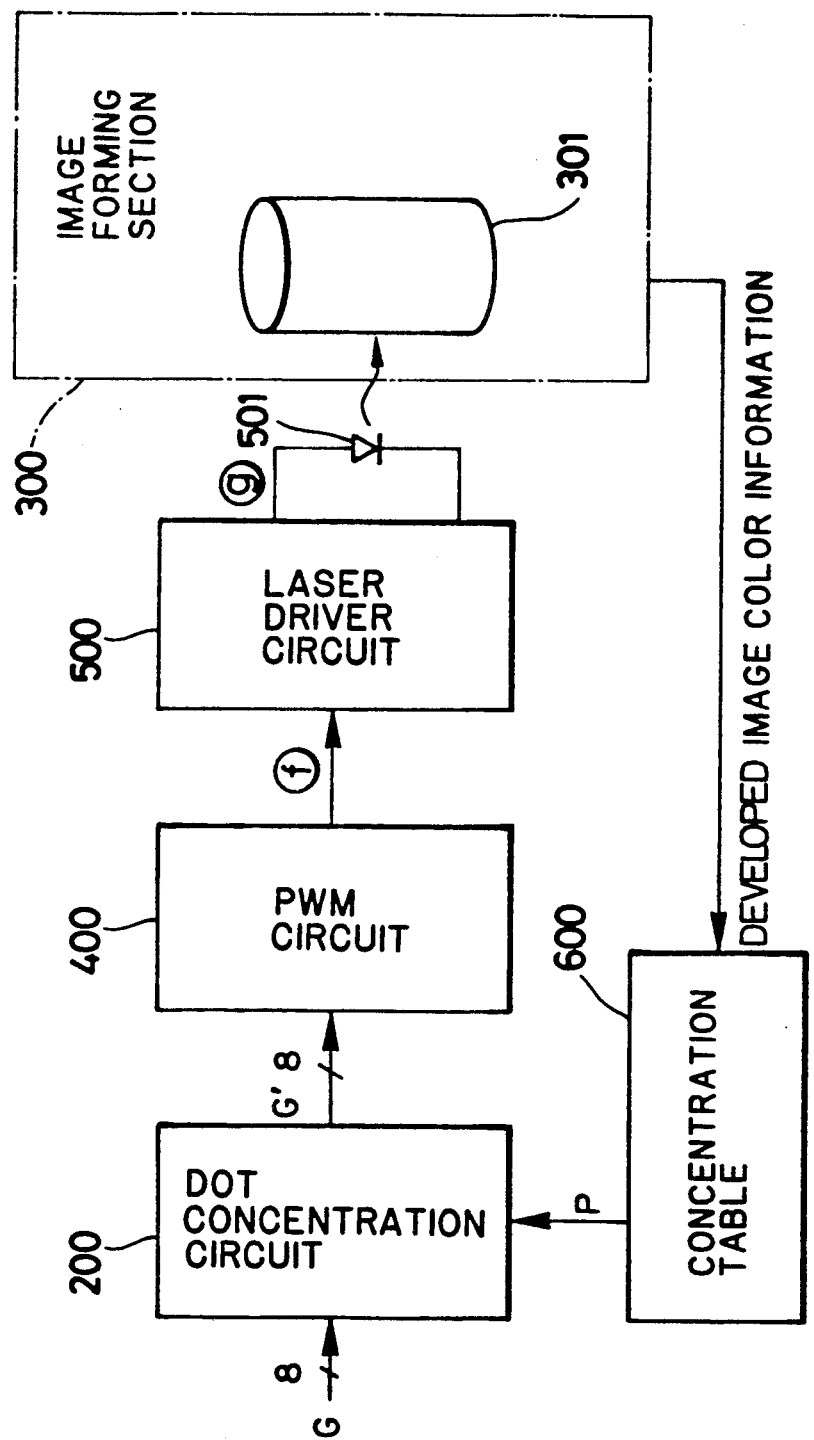
FIG. 1 is a block diagram of a laser beam printer in accordance with an embodiment of the present invention.

FIG. 1 shows blocks of a laser beam printer in accordance with an embodiment of the present invention. A dot concentration circuit 200 divides input pixel data G (8-bit) into groups of data items corresponding to respective pixel blocks based on concentration conversion information (priority order P) on a predetermined phase and predetermined configurations, and converts the group of pixel data items corresponding to each pixel block based on the density conversion information if the corresponding group contains highlight data designating a density not higher than a predetermined level. A PWM circuit 400 converts pixel data G' output from the dot concentration circuit 200 into a PWM signal $f$ having a pulse width according to the density designated by this data. A laser driver circuit 500 drives a semiconductor laser element 501 by switching the same on and off. An image forming section 300 develops images of respective color patterns (Y, M, C, $B_K$) formed by exposure with the laser beam of the laser element 501, and forms a color image by superposing the color patterns. The density conversion information with respect to each color is output from a concentration table 600 according to developed image color information (Y, M, C, $B_K$) supplied from the image forming section 300.

FIGS. 2A to 2D show an example of density conversion information in accordance with the embodiment of FIG. 1. This example relates to a case in which the block phase=0 and the block configurations=rectangle (1×2, 2×1) as designated by the density conversion information. The use of such information is advantageous in that the concentration circuit 200 can be formed of simple hardware. The density conversion information is stored in a ROM or RAM (not shown) and is read out as the block identification proceeds.

Figure 2A:
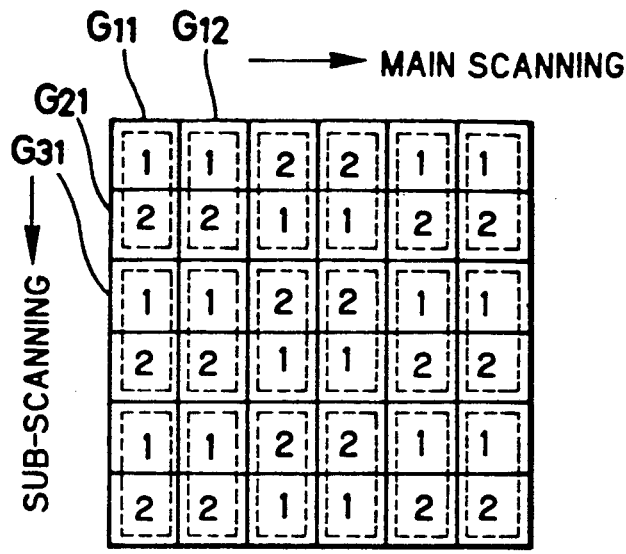
FIGS. 2A to 2D are diagrams of an example of density conversion information in accordance with the embodiment of FIG. 1.

FIG. 2A shows magenta density conversion information constituting blocks of a 2×1 type as indicated by the broken line. Numerals in each block designate a priority order P for density concentration. A sequence of pixel data items $G_{11}$, $G_{12}$, $G_{13}$, ... corresponds to a main scanning direction while a sequence of pixel data items $G_{11}$, $G_{21}$, $G_{31}$, ... corresponds to a sub-scanning direction.

In accordance with this information, with respect to the image picture block corresponding to data items $G_{11}$ and $G_{21}$, the corresponding priority order P designated by the density conversion information is (1, 2). If pixel data item $G_{11}$ or $G_{21}$ is highlight data designating a density not higher than the predetermined level, this data item cannot be used alone for density formation. Therefore the total sum of, for example, the pixel block ($G_{11}$ and $G_{21}$) is taken and assigned to pixel data $G_{11}$ having the first priority, while pixel data $G_{21}$ is reduced to naught. Then, skipping one block, the block corresponding to data items $G_{13}$ and $G_{23}$ is examined. The corresponding priority order P is (2, 1) reverse to that in the above. Accordingly, the total sum of the pixel block ($G_{13}$ and $G_{23}$) is taken and assigned to pixel data $G_{23}$ while pixel data $G_{13}$ is reduced to naught.

Figure 2B:
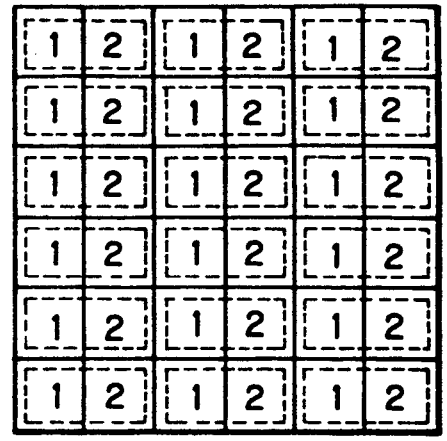

FIG. 2B shows cyan density conversion information constituting blocks of a 1×2 type. As in the case of FIG. 2A, the block phase=0 in accordance with the present invention, which indicates that the array of blocks starts from the first pixels at the upper left corner. The priority order P designated by the density conversion information shown in FIG. 2B is (1, 2) and is constant with respect to all the blocks.

Figure 2C:
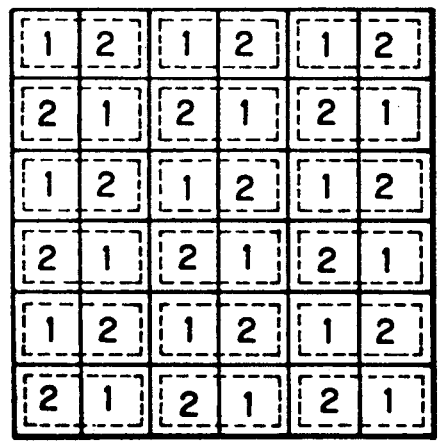
Figure 2D:
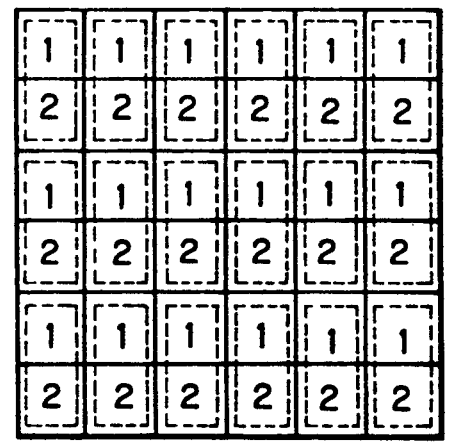

FIG. 2C shows yellow density conversion information constituting blocks of the 1×2 type. The priority order P designated by the density conversion information is (1, 2) or (2, 1) every other line.

FIG. 2A shows black density conversion information constituting blocks of the 2×1 type. The priority order P designated by the density conversion information is (1, 2) and is constant with respect to all the blocks.

In the relationship between, for example, magenta and block, superposition of two colors is effected on ½ of all the pixel blocks by density conversion, if each of the groups of data items corresponding to all the pixel blocks contains highlight data designating a density not higher than the predetermined level. The number of pixels on which these colors are superposed is not changed even if the color patterns are relatively shifted in the longitudinal direction to an extent corresponding to one dot at the time of printing. The corresponding number of pixels is also constant even if the two color patterns are shifted in the lateral direction to the same extent.

The same can also be said with respect to all other combinations of the colors. Thus, the block type (m×n) for each color is selected in consideration of the properties of each color influencing the visual sensation, the direction in which a printing superposition error tends to occur, the number of dots with which a printing superposition error tends to occur, and so on. The sum of m and n must be an integer equal to or greater than 3. For this example of density conversion data, a method of changing the priority order P every block group selected as desired is adopted.

FIGS. 3A to 3D shows numerical values representing an example of density conversion based on the construction of the information shown in FIGS. 2A to 2D. In this example, if the PWM signal width t with which density formation can be effected stably by the image forming section 300 is 10 ns (corresponding to the minimum density D=25), the threshold density C is set to a value larger than the density D, e.g., 30.

Figure 3A:
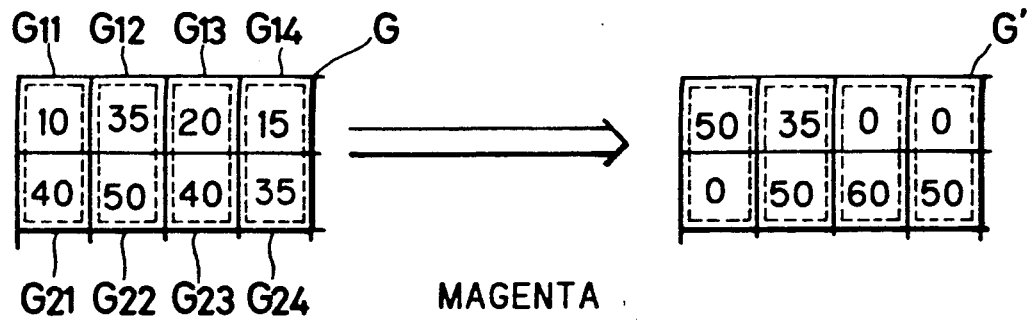
FIGS. 3A to 3D are diagrams showing numerical values for density conversion based on the information shown in FIGS. 2A to 2D.

FIG. 3A shows an example of conversion of magenta. Each of numerical values in the blocks on the left hand side of FIG. 3A decimally indicates the pixel density before the conversion by while each of numerical values on the right hand side decimally indicates the pixel densities after the conversion. With respect to the first pixel block on the left hand side, $(G_{11}, G_{21})=(10, 40)$. $G_{11}$ (=10) is smaller than the predetermined threshold value C (=30). Ordinarily, it is not possible to effect dot formation at the density 10 by performing PWM conversion of $G_{11}$. On the other hand, the priority order P is (1, 2) as shown in FIG. 2A. The, the total sum (=50) of the pixel block (10, 40) is taken. Since the total sum (50) is not greater than the maximum density (=255) of one pixel, it is written in $G_{11}'$ having the first priority, while 0 (white level) is written in $G_{21}'$. Accordingly, with respect to the first pixel block on the right hand side, $(G_{11}', G_{21}')=(50, 0)$ is determined. Similarly, with respect to the second pixel block on the left hand side, $(G_{12}, G_{22})=(35, 50)$. Either value is greater than the predetermined threshold value C (=30). Accordingly, with respect to the second pixel block on the right hand side, $(G_{12}', G_{22}')=(35, 50)$ is determined. With respect to the third pixel block on the left hand side, $(G_{13}, G_{23})=(20, 40)$, and $G_{13}<C$ is satisfied. Since the priority order of the data items corresponding to the third image picture block is (2, 1), $(G_{13}', G_{23}')=(60, 0)$ is determined with respect to the third pixel block on the right hand side.

Figure 3B:
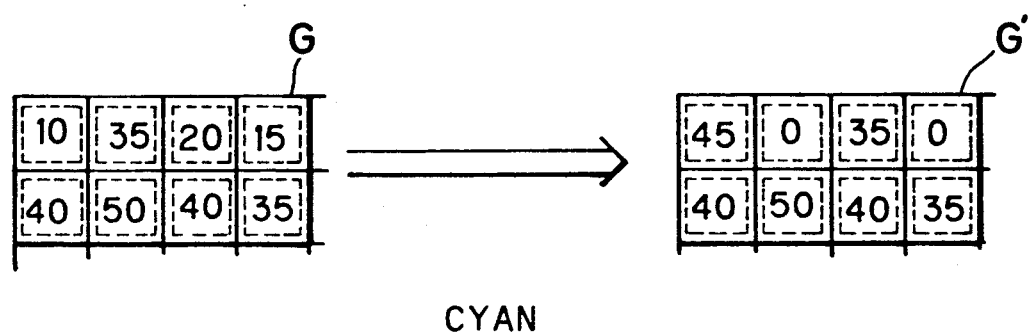
Figure 3C:
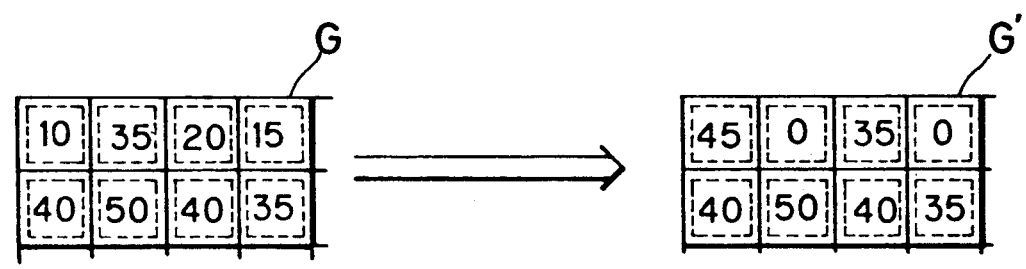
Figure 3D:
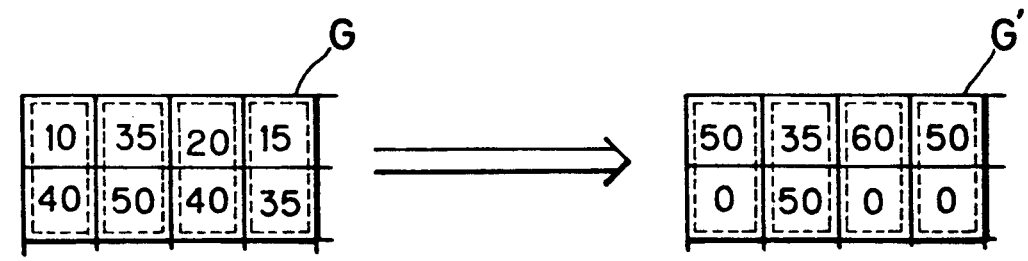

FIGS. 3B, 3C, and 3D show examples of conversion of cyan data, yellow data and black data, respectively. The conversion operation can be explained in the same manner as the conversion shown in FIG. 3A.

Figure 4:
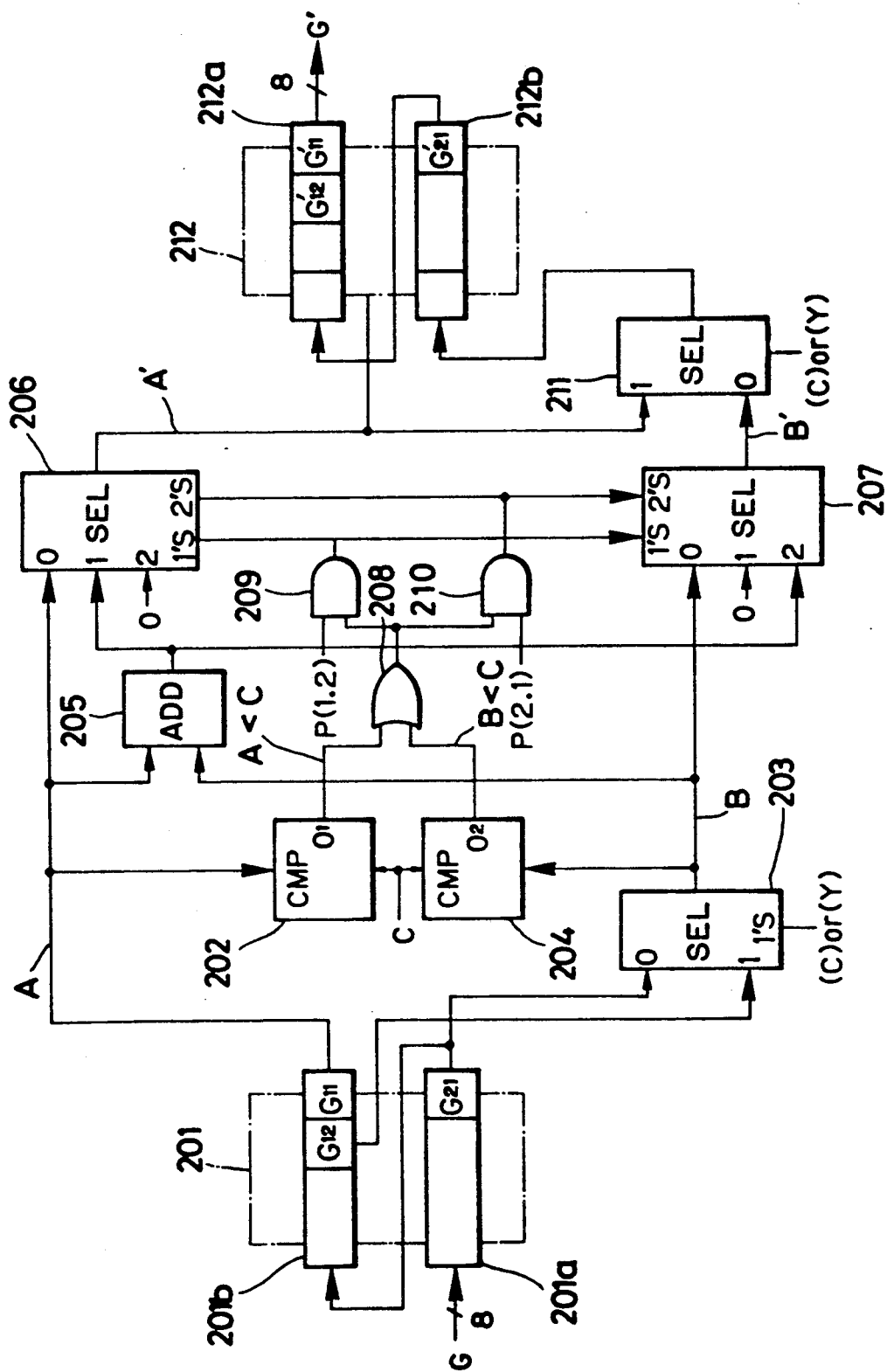
FIG. 4 is a block diagram of a dot concentration circuit of the embodiment using the conversion information shown in FIGS. 2A to 2D.

FIG. 4 shows blocks of the dot concentration circuit of the embodiment using the conversion information shown in FIGS. 2A to 2D. As illustrated, an input buffer 201 is constituted by one-line 8-bit shift registers 201a and 201b. If pixel data G for two lines is supplied, pixel data items are arrayed as shown in FIG. 4. It is assumed here that these data positions are called registers $G_{11}, G_{12}, \ldots, G_{21}$. A comparator (CMP) 202 compares the threshold value C and pixel data A of the register $G_{11}$, and outputs a logical 1 level through an output terminal $O_1$ if A<C. A selector (SEL) 203 selects pixel data from the register $G_{21}$ to output pixel data B, when the developed image color signal supplied from the image forming section 300 indicates magenta (M) or black ($B_K$). The selector 203 selects pixel data from the register $G_{12}$ to output pixel data B, when the developed color signal indicates cyan (C) or yellow (Y). This operation is adapted for the block types shown in FIGS. 2A and 2D. A comparator (CMP) 204 compares the threshold value C and pixel data B and outputs a logical 1 level through an output terminal $O_2$ if B<C. The signals (A<C) (B<C) obtained by the comparison are supplied to an OR circuit 208 to form logical OR which is supplied to AND gate circuits 209 and 210. The other input to the AND gate 209 is priority order P (1, 2). The AND gate 209 outputs a selection signal 1'S. The other input to the AND gate 210 is priority order P (2, 1), and the AND gate 210 outputs a selection signal 2'S. An adder (ADD) 205 outputs the sum (A+B) of pixel data A, B. A selector (SEL) 206 selects and outputs pixel data A supplied to its input terminal 0, pixel data (A+B) supplied to its input terminal 1 or pixel data 0 supplied to its input terminal 2 according to the decoded values (0, 1, 2) of the selection signals 1'S and 2'S. Correspondingly, a selector (SEL) 207 selects and outputs pixel data B supplied to its input terminal 0, pixel data 0 supplied to its input terminal 1 or pixel data (A+B) supplied to its input terminal 2 according to the decoded values of the selection signals 1'S and 2'S. In consequence, output pixel data (A', B') is (A, B) if both the comparison signals (A<C) and (B<C) are unsatisfied, or is {(A+B), 0} if at least one of (A<C) and (B<C) is satisfied and if the priority order P is (1, 2) or {0, (A+B)} if at least one of (A<C) and (B<C) is satisfied and if the priority order P is (2, 1). An output buffer 212 is constituted by one-line 8-bit shift registers 212a and 212b. If pixel data G' to be output for two lines is supplied, pixel data items are arrayed as shown in FIG. 4. It is assumed here that these data positions are called registers $G_{11}', G_{12}', \ldots, G_{21}'$. A selector 211 outputs pixel data B' alone when the developed image color signal supplied from the image forming section 300 indicates magenta (M) or black ($B_K$). In this event, a control circuit (not shown) writes pixel data A' in the shift register 212a and writes pixel data B' in the shift register 212b. The selector 211 outputs pixel data A' and pixel data B' in a time division manner when the developed image color signal indicates cyan (C) or black (Y).

Figure 7:
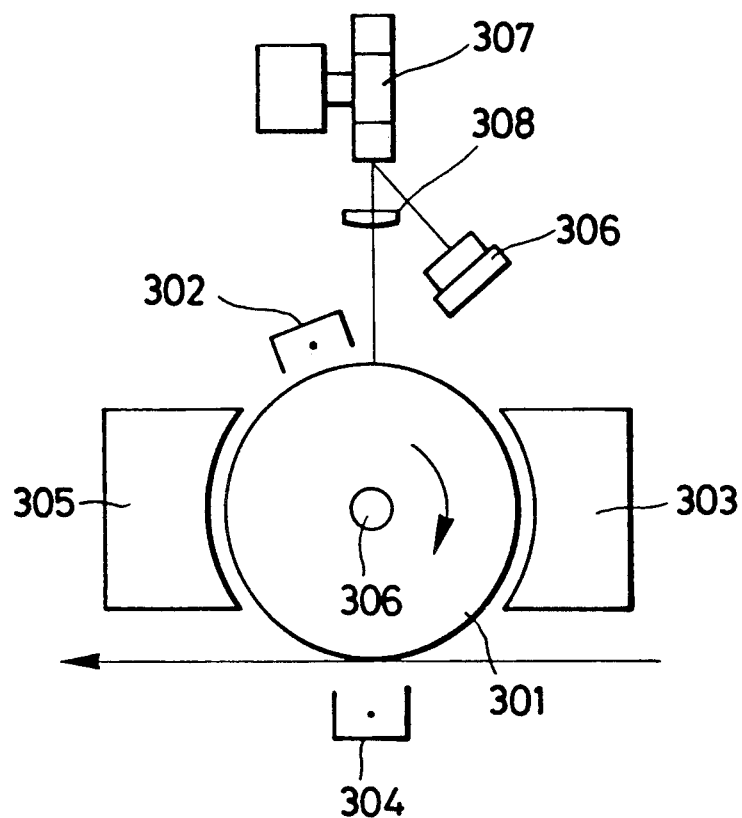
FIG. 7 is a schematic diagram of the construction of an image forming section 300 of the embodiment of FIG. 1.

In this event, the control circuit supplies the pixel data to the shift register 212b in the order of A' and B' while shifting the data items two pixel positions. This control is adapted for the block types shown in FIGS. 2A to 2D. A signal which controls the selectors 203 and 211 is output from the printer controller synchronously with the color formation of C, M and Y in frame sequential method of the printer as shown in FIG. 7.

Figure 5:
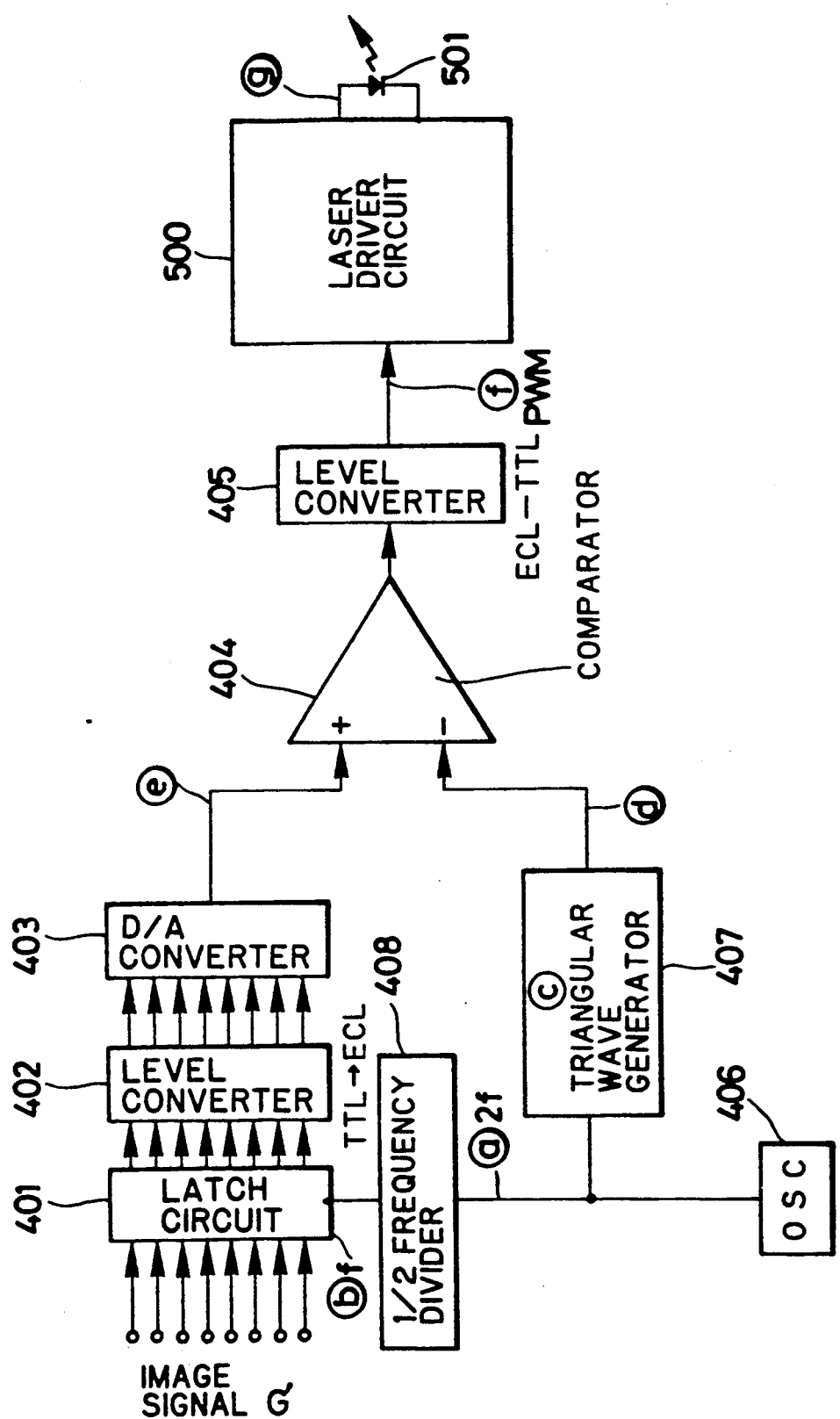
FIG. 5 is a block diagram of an example of a PWM circuit 400 of the embodiment of FIG. 1.
Figure 8:
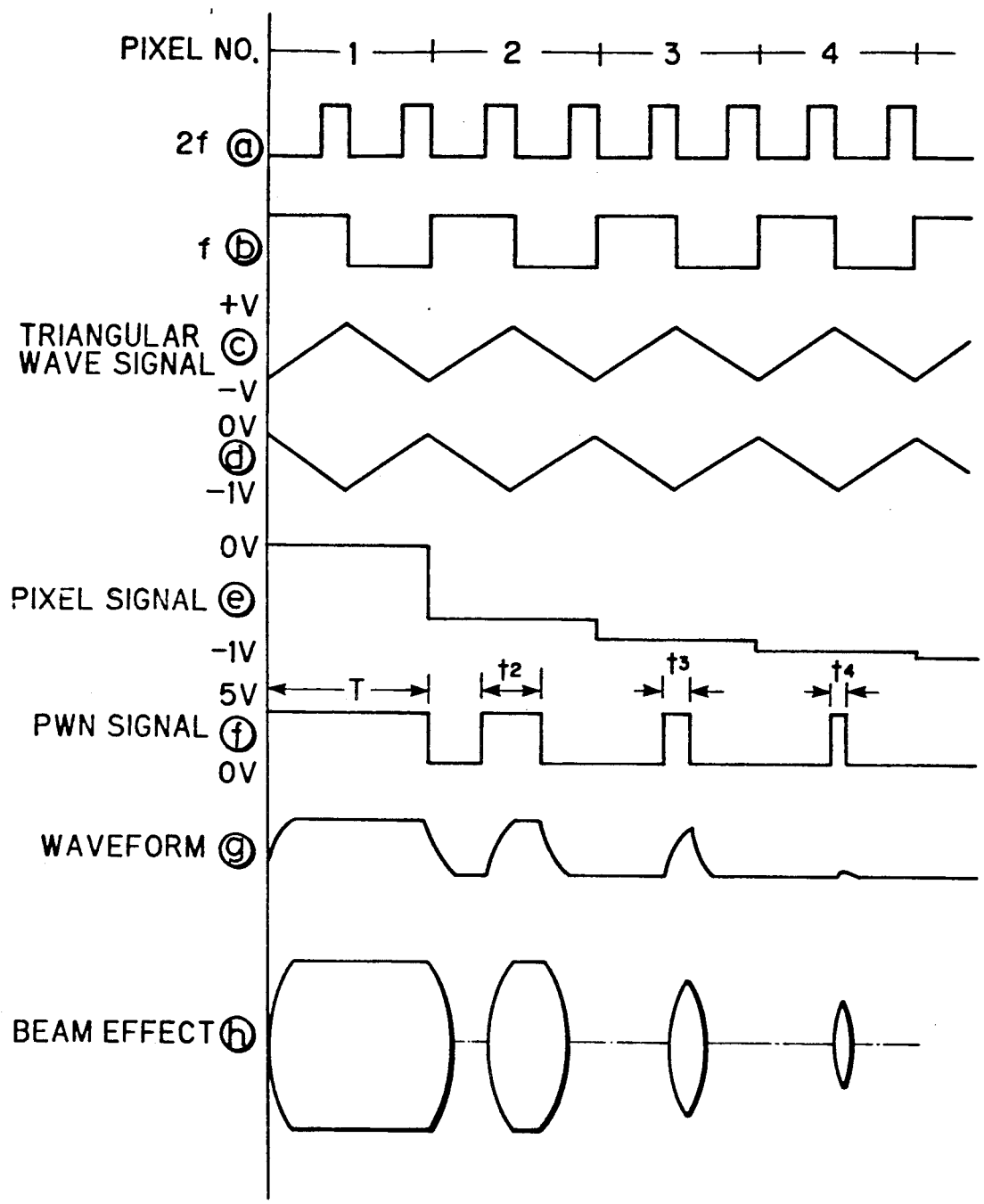
FIG. 8 is a diagram of waveforms showing the timing of the operation of the PWM circuit 400.

FIG. 5 shows blocks of an example of the PWM circuit 400, and FIG. 8 shows the timing of the operation of the PWM circuit 400. A clock generator 406 generates a clock signal (a) having a frequency 2f. A ½ frequency divider 408 frequency-divides the clock signal (a) by half to form a pixel clock signal (b) having a frequency f. A triangular wave generator 407 forms a triangular wave signal (d) of an ECL level ($-1$ to $0$ V) in synchronism with the clock signal (a).

A latch circuit 401 latches pixel data G' (8-bit) in synchronism with the pixel clock signal (b). A level conversion circuit 402 converts the TTL level of the output from the latch circuit 401 into the ECL level. A high-speed ECL D/A converter 403 converts pixel data G' output from the level converter 402 into a pixel signal (e) of an analog level corresponding to the density. Several examples of sampled densities are indicated in FIG. 8 although the pixel signal (e) changes by steps of 256 graduation levels between 0 (white tone) and 255 (full tone). The first pixel exhibits a full tone level; the second pixel, a half-tone level; the third pixel, a highlight tone level exceeding the threshold level 30; and the fourth pixel, a highlight tone level not exceeding the threshold level 30 (which highlight tone level is, in fact, eliminated by the density conversion processing). A high-speed ECL comparator 404 compares the analog signal (e) and the triangular wave signal (d) to generates a PWM signal having pulse widths $T$, $t_2$, $t_3$, $t_4$ (not actually generated) corresponding to the density levels indicated by the analog signal (e). A level converter 405 converts the PWM signal of the ECL level into PWM signal (f) of the TTL level which is supplied to the laser driver circuit 500.

Figure 6:
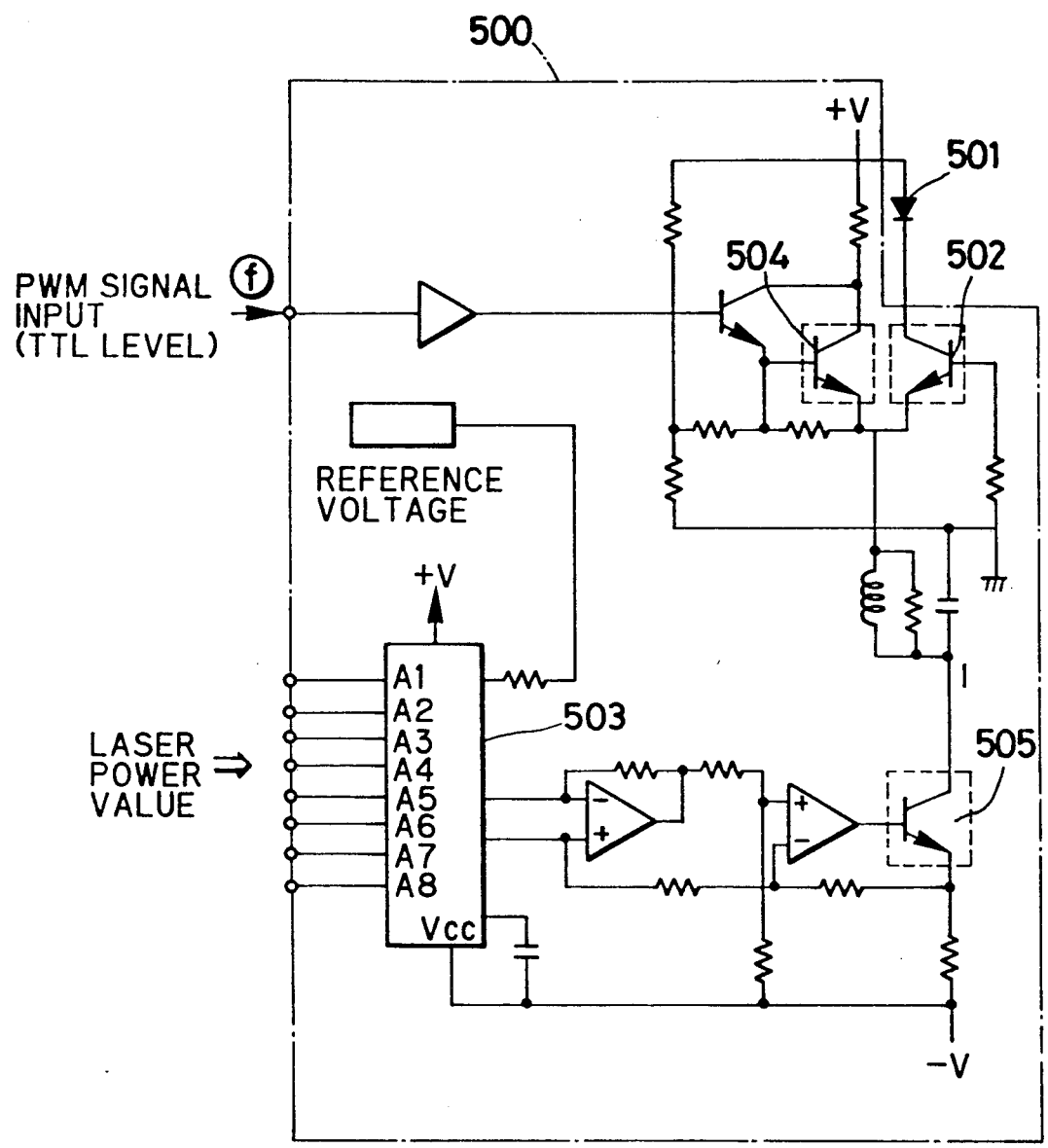
FIG. 6 is a circuit diagram of a laser driver circuit 500 of the embodiment of FIG. 1.

FIG. 6 is a circuit diagram of the laser driver circuit 500 of the embodiment. As shown in FIG. 6, a transistor 505 constitutes a constant-current circuit whose constant current value I can be set by a laser power value (8-bit) supplied to a D/A converter 503. Transistors 502 and 504 constitute a current switch circuit for effecting on-off control of the constant current I according to the PWM signal (f), which current is to be supplied to the semiconductor laser element 501.

FIG. 7 schematically shows the construction of the image forming section 300 of the embodiment. The image forming section 300 includes a mechanical section which has a photosensitive drum 301 capable of rotating on a shaft 306 in the direction of the arrow, an electrifier 302, a development device 303 for development of colors Y, M, C, $B_K$, a transfer discharger 304, and a cleaning device 305. The components 302 to 305 are successively disposed around the photosensitive drum 301 in the direction of rotation of the same. The image forming section 300 also includes an optical system disposed above the photosensitive drum 301 as viewed in FIG. 7. The optical system has a semiconductor laser device 306, a polygonal mirror 307 capable of rotating at a high constant speed, an f-$\theta$ lens 308, a shutter plate (not shown), and so on.

The semiconductor laser device 306 emits laser light based on PWM signal (g) to irradiate side surfaces of the polygonal mirror 307. As the polygon mirror 307 is rotating at the high constant speed, the drum surface passing the position between the electrifier 302 and the development device 303 is scanned (exposed) in the direction of a base line of the drum with the laser beam reflected by the mirror side surfaces.

Figures 9, 10A, 10B:
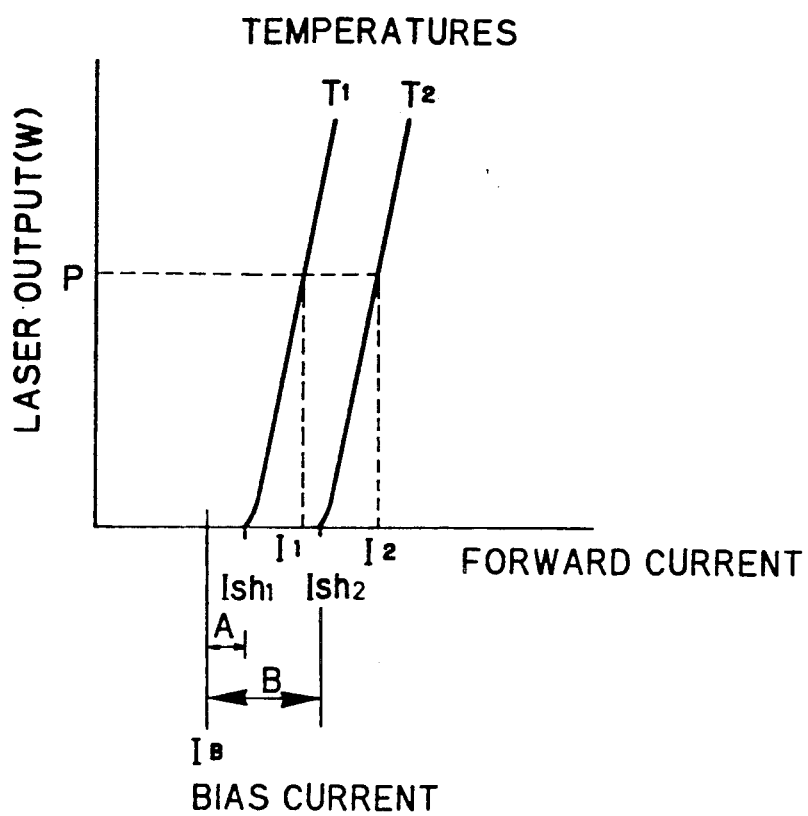
FIG. 9 is a diagram of emission characteristics of the semiconductor laser element.
FIGS. 10A and 10B are diagrams of an example of printing in accordance with the embodiment of FIG. 1 with respect to colors ○ and x.

FIGS. 10A and 10B show an example of printing in accordance with the described embodiment with respect to the colors ○ and x. FIG. 10A illustrates a state in which density conversion of the colors ○ and x is effected, and in which the densities of the colors ○ and x are concentrated on the left hand side in the upper half so that the two colors are superposed, while the densities of the colors ○ and x are respectively concentrated on the right hand side and on the left hand side in the lower half, so that the two colors are not superposed. FIG. 10B illustrates a state in which printing of the color x is shifted rightward to an extent corresponding to one pixel. While the two colors are superposed in the lower half while being not superposed in the upper half.

In the above described embodiment, the density conversion information designates block phase=0 and block configuration=rectangle (m×n). Other embodiment of the present invention relating to block configurations other than rectangles will be described below.

FIGS. 15A to 15D show an example of density conversion information in accordance with another embodiment. Referring to FIG. 15A, the image blocks ($G_{11}$, $G_{21}$) and ($G_{12}$, $G_{22}$) are first examined, and the image blocks ($G_{23}$, $G_{33}$) and ($G_{24}$, $G_{34}$) are examined next by shifting the selecting position by one pixel. If the blocks are selected in this manner, the positions in which the image density is concentrated (the positions of $P=1$) in the whole image are in a checker-like pattern, thereby achieving the same effects as the patterns shown in FIGS. 2A to 2D. Also, the same priority order P (1, 2) can be assigned for the respective blocks.

In this embodiment, the density conversion information shown in FIGS. 15A to 15D is stored in the concentration table 600, and the density conversion information for each color is read out according to developed image color information supplied from the image forming section 300. The operation of the dot concentration circuit 200 may be realized by a software system (not shown) including the use of a CPU to effect density conversion of the pixel data for each color (highlighted portions) in accordance with the density conversion information patterns shown in FIGS. 15A to 15D. Details of the conversion algorithm are the same as those described above.

FIGS. 11A to 11C show examples block types in accordance with other embodiments of the present invention. The block shown in FIG. 11A consists of five pixels, and priority order P is designated with 1 to 5. In this case, density values of pixel data are successively compared with the threshold value C from the lowest-order (5) pixel data item to the highest order (1) pixel data item. If the density value of the pixel data item of the priority order 5 is smaller than the threshold value C, this density value is distributed to the image data items of priority orders 1 to 4. The distribution ratio may be uniform or may be weighted based on the priority order. Thereafter, the same processing is effected with respect to the image data items of priority order 4, 3, 2, 1.

Needless to say, the density values of the respective pixel data items may be examined in a suitable order different from that in the above instead of being examined from the lower order; if one of the pixel data density values is smaller than the threshold value, this density value is added to that of the pixel data of priority order 1. If the density value of the priority order 1 pixel data exceeds the maximum value 255, the excess value is added to that of the priority order 2 pixel data.

Each of the blocks shown in FIGS. 11B and 11C consists of five pixels, and is different in configuration from the block shown in FIG. 11A. Irrespective of these shapes, the highlight density is distributed to the pixel data of the higher priority order.

FIGS. 12A to 12D show examples of application of the density conversion blocks of these embodiments to magenta to black processing. Referring to FIG. 12A, the block type shown in FIG. 11A is applied to magenta density conversion. The block type shown in FIG. 11A is also applied to cyan density conversion while changing the block phase, as shown in FIG. 12B. The block type shown in FIG. 12C is applied to yellow density conversion, as shown in FIG. 12C, and the block type shown in FIG. 12D is applied to black density conversion, as shown in FIG. 12D. By changing the block configuration and/or the block phase in this manner, it is possible to periodically overlap the pixels on which the density is concentrated with respect to each color. Accordingly, the dots are overlapped periodically generally at the same rate even if a printing superposition error occurs. In the resulting image, changes in color tones at a highlighted portion can always be limited.

In the above description for the embodiments, the minimum PWM signal width t with which density formation can be effected is set to 10 ns (=threshold density 30). However, this width can be set to other values. The threshold density may be made variable to enable fine density conversion control.

A laser beam printer based on electrophotography is described above to explain the embodiments. However, the present invention is not limited to this, and can also be applied to other types of printer, e.g., ink jet printers, thermal printers, and so on, which may entail the same technical problem solved by the present invention.

The present invention is not limited to full color image formation using four colors; it may be applied to full color image formation using three colors. In short, it can be applied to any multi-color image formation process in which some colors are superposed on one region.

In accordance with the present invention, as described above, changes in color tones at a highlighted portion of an image are reduced and the color tones are stabilized.

It should also be understood that the present invention includes other changes, additions and modifications so long as they do not constitute departures from the spirit and scope of the invention set forth in the appended claims.

What is claimed is:

1. An image processing apparatus comprising:
   input means for inputting, for each pixel, multi-level image data having a plurality of color components;
   dividing means for dividing input multi-level image data into a plurality of blocks, each of which has a plurality of pixels; and
   converting means for converting input multi-level image data of a plurality of pixels in each block in such manner as to concentrate density of a respective block to at least one predetermined pixel position in the respective block when at least one density represented by the pixel data in the respective block is less than a predetermined density; and
   output means for outputting multi-level image data having a plurality of color components for each pixel from said converting means,
   wherein for each color component there is at least one respective predetermined pixel position to which said converting means concentrates the density.

2. An image processing apparatus according to claim 1, wherein the predetermined pixel position for one color component has a different periodicity from other color components.

3. An apparatus according to claim 1, further comprising:
   binary coding means for converting multi-level image data output from said output means into binary data; and
   image forming means for forming a color image in accordance with the binary data output from said binary coding means.

4. An image forming apparatus according to claim 1, wherein the multi-level image data contains components of yellow, magenta and cyan.

5. An image forming apparatus according to claim 1, wherein said converting means further comprises comparing means for comparing the multi-level image data with predetermined data value and adding means for adding multi-level image data of a plurality of pixels.

6. An image forming apparatus according to claim 3, wherein said binary coding means further comprises a pulse-width modulation circuit.

7. An image forming apparatus according to claim 3, wherein said image forming means comprises a frame sequential color printer.

8. An image forming apparatus according to claim 7, wherein said image forming means comprises a laser beam printer.

9. An image forming apparatus according to claim 3, wherein the predetermined density is set to a value not smaller than the minimum of pixel density levels at which image development can be effected by said image forming means.

10. An image processing method comprising the steps of:
    inputting, for each pixel, multi-level image data having a plurality of color components;
    dividing input multi-level image data into a plurality of blocks, each of which has a plurality of pixels;
    converting input multi-level image data of a plurality of pixels in each block in such manner as to concentrate density a respective block to at least one predetermined pixel position in the respective block when at least one density represented by the pixel data in the respective block is less than a predetermined density; and
    outputting converted multi-level image data having a plurality of color components for each pixel,
    wherein, for each color component, there is at least one respective predetermined pixel position to which the density of the block is concentrated.

11. A method according to claim 10, wherein the predetermined pixel position for one color component has a different periodicity from other color components.

12. A method according to claim 10, further comprising the step of binarizing converted multi-level image data.

13. A method according to claim 12, further comprising the step of forming a color image in accordance with binarized image data.

14. A method according to claim 12, wherein said binarizing step includes performing pulse-width modulation.

* * * * *

UNITED STATES PATENT AND TRADEMARK OFFICE
CERTIFICATE OF CORRECTION

PATENT NO. : 5,130,808
DATED : July 14, 1992
INVENTOR(S) : KAZUHISA KEMMOCHI

It is certified that error appears in the above-identified patent and that said Letters Patent is hereby corrected as shown below:

IN [57] ABSTRACT

Line 13, "value is satisfied," should read --value,--.

COLUMN 1

Line 12, "typelaser" should read --type laser--.
   Line 16, "code" should be deleted.

COLUMN 2

Line 3, "in" (second occurrence) should be deleted.
   Line 4, "which the direction" should be deleted.
   Line 55, "density<(the" should read --density is less
           than the-- and "value) is" should read --value;--.

COLUMN 3

Line 10, "(the" should read --the--.

COLUMN 5

Line 49, "by" should be deleted.

COLUMN 7

Line 36, "ates" should read --ate--.

UNITED STATES PATENT AND TRADEMARK OFFICE
CERTIFICATE OF CORRECTION

PATENT NO. : 5,130,808
DATED : July 14, 1992
INVENTOR(S) : KAZUHISA KEMMOCHI

It is certified that error appears in the above-identified patent and that said Letters Patent is hereby corrected as shown below:

COLUMN 10

Line 47, "density" should read --density of--.

Signed and Sealed this

Twenty-fourth Day of August, 1993

Attest:

BRUCE LEHMAN

Attesting Officer          Commissioner of Patents and Trademarks